Figure 1:
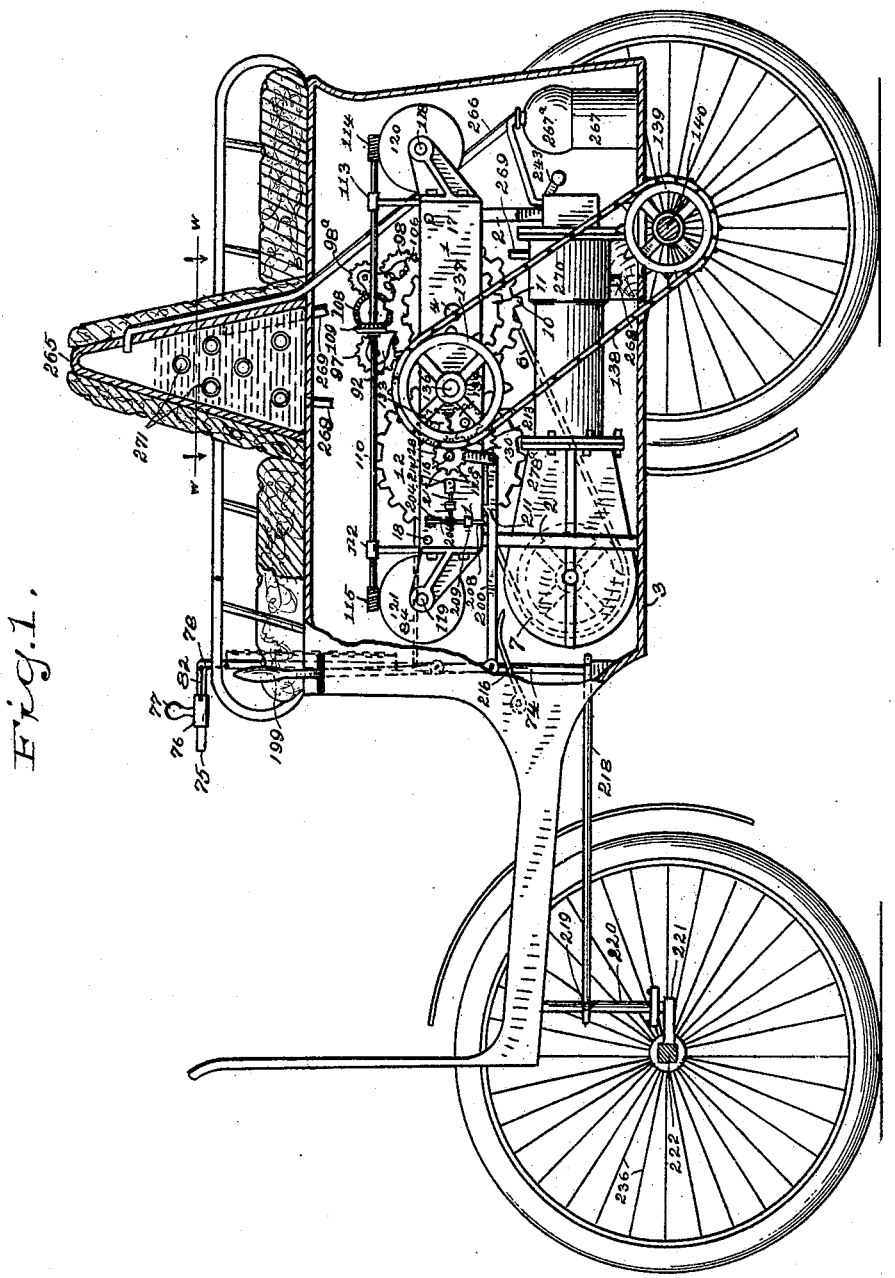

No. 618,915. Patented Feb. 7, 1899.
C. STERLING.
MOTOR VEHICLE.
(Application filed Dec. 21, 1897.)
(No Model.) 11 Sheets—Sheet 1.

WITNESSES
H. A. Lamb
M. J. Keane

INVENTOR
Clarence Sterling
By his Atty.
Geo. A. Phillips

No. 618,915. Patented Feb. 7, 1899.
C. STERLING.
MOTOR VEHICLE.
(Application filed Dec. 21, 1897.)

(No Model.) 11 Sheets—Sheet 3.

WITNESSES
H. A. Lauls
M. J. Keane

INVENTOR
Clarence Sterling.
By his Atty.
Geo. D. Phillips.

No. 618,915. Patented Feb. 7, 1899.
C. STERLING.
MOTOR VEHICLE.
(Application filed Dec. 21, 1897.)
(No Model.) 11 Sheets—Sheet 4.
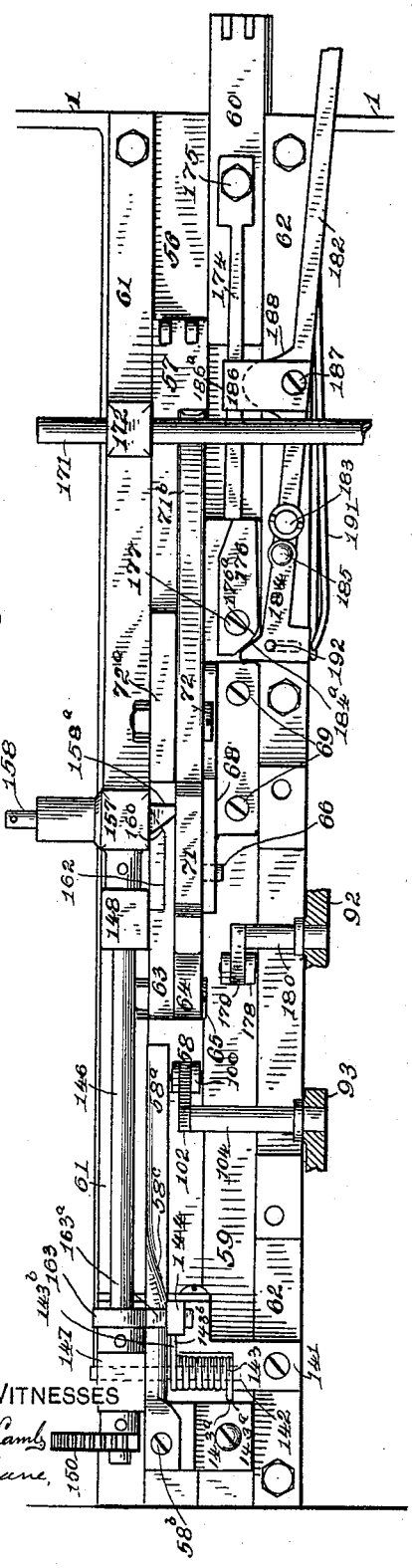
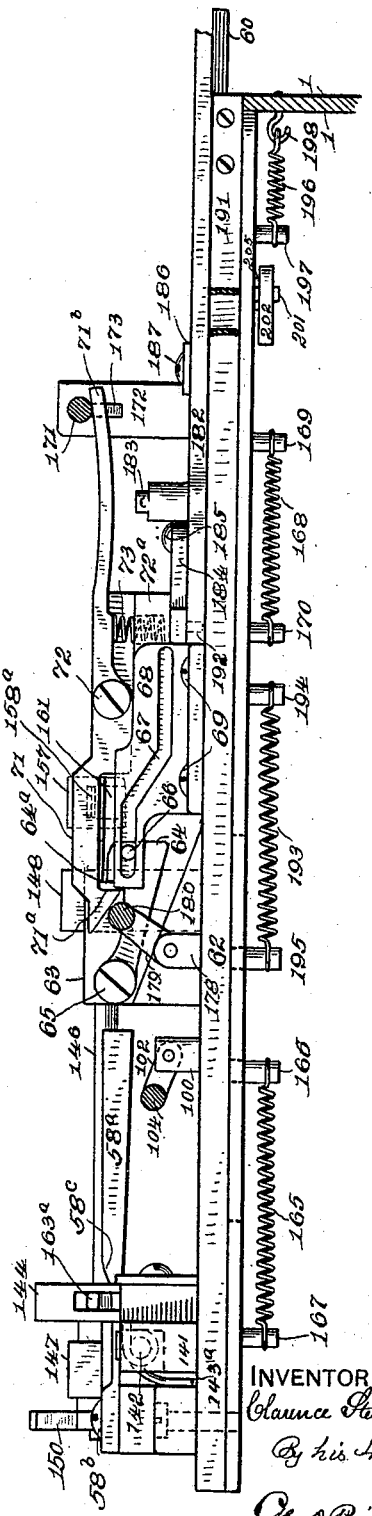
WITNESSES
H. A. Lamb
M. J. Keane
INVENTOR
Clarence Sterling.
By his Atty,
Geo. D. Phillips.
THE NORRIS PETERS CO., PHOTO-LITHO., WASHINGTON, D. C.

No. 618,915. Patented Feb. 7, 1899.
C. STERLING.
MOTOR VEHICLE.
(Application filed Dec. 21, 1897.)
(No Model.) 11 Sheets—Sheet 5.
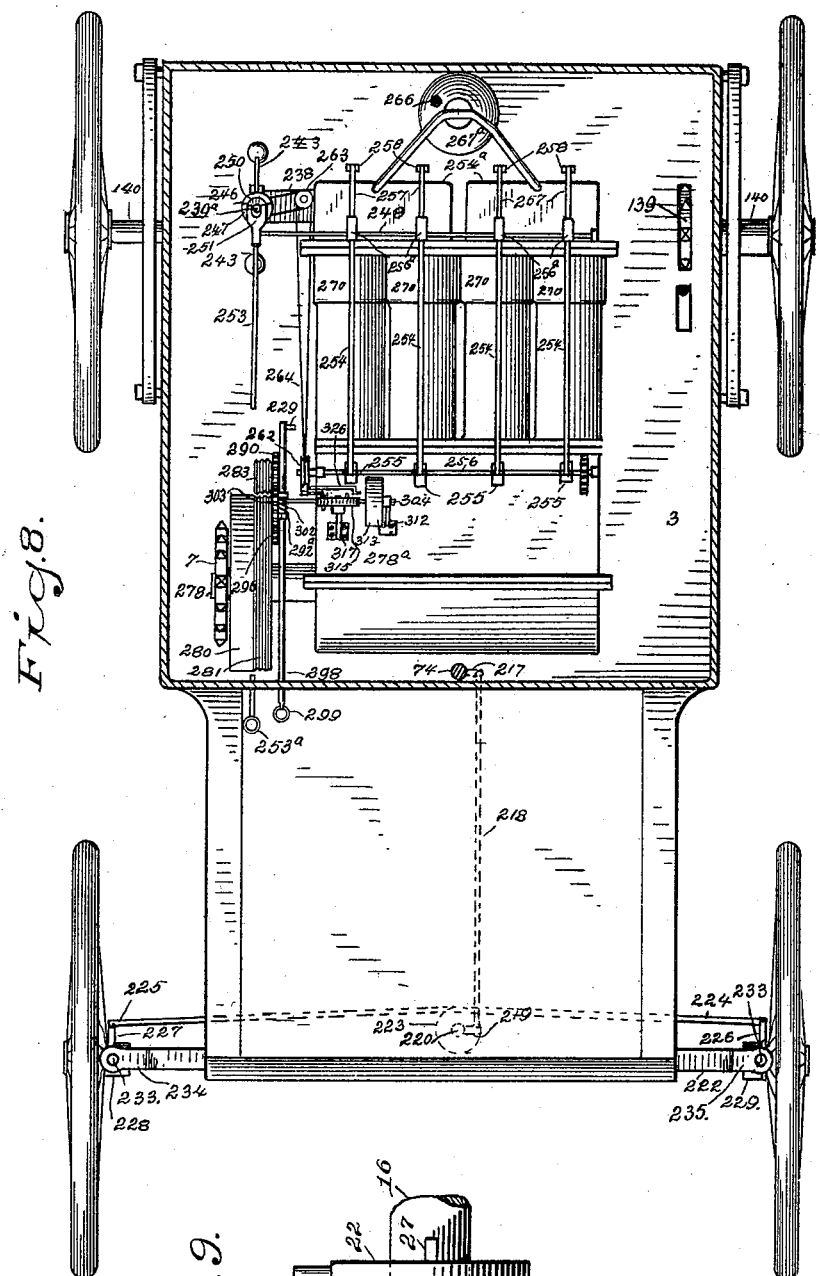
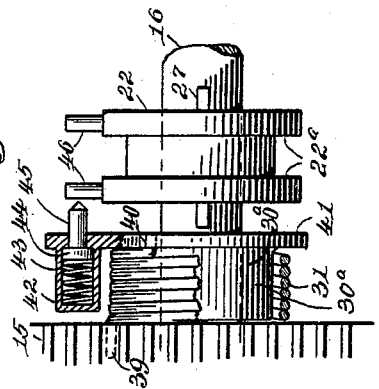
WITNESSES
H. A. Lamb
M. J. Keane
INVENTOR
Clarence Sterling
By his Atty
Geo. D. Phillips No. 618,915. Patented Feb. 7, 1899.
C. STERLING.
MOTOR VEHICLE.
(Application filed Dec. 21, 1897.)
(No Model.) 11 Sheets—Sheet 6.

WITNESSES
H. H. Sauls
M. J. Keane

INVENTOR
Clarence Sterling
By his Atty.
Geo. D. Phillips

THE NORRIS PETERS CO., PHOTO-LITHO., WASHINGTON, D. C.

No. 618,915. C. STERLING. Patented Feb. 7, 1899.
MOTOR VEHICLE.
(Application filed Dec. 21, 1897.)
(No Model.) 11 Sheets—Sheet 7.
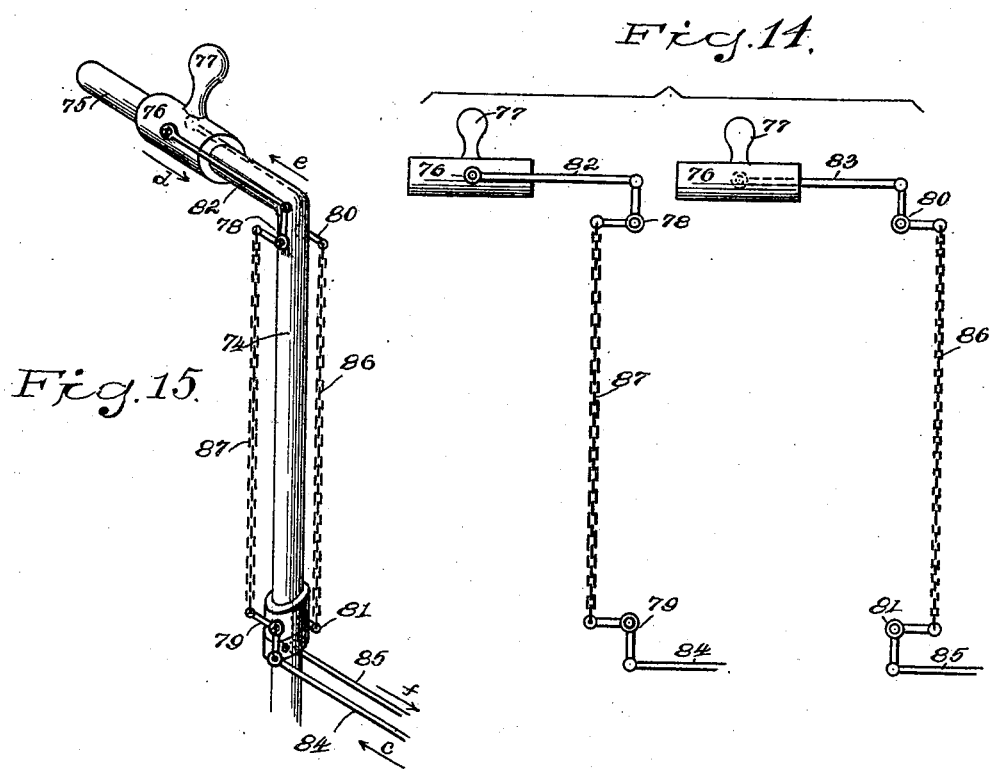
WITNESSES
INVENTOR
Clarence Sterling
By his Atty.
Geo. D. Phillips No. 618,915. Patented Feb. 7, 1899.
C. STERLING.
MOTOR VEHICLE.
(Application filed Dec. 21, 1897.)
(No Model.) 11 Sheets—Sheet 8.

WITNESSES
H. A. Sauls
M. J. Keane.

INVENTOR
Clarence Sterling.
By his Atty.
Geo. D. Phillips.

No. 618,915. Patented Feb. 7, 1899.
C. STERLING.
MOTOR VEHICLE.
(Application filed Dec. 21, 1897.)
(No Model.) 11 Sheets—Sheet 9.
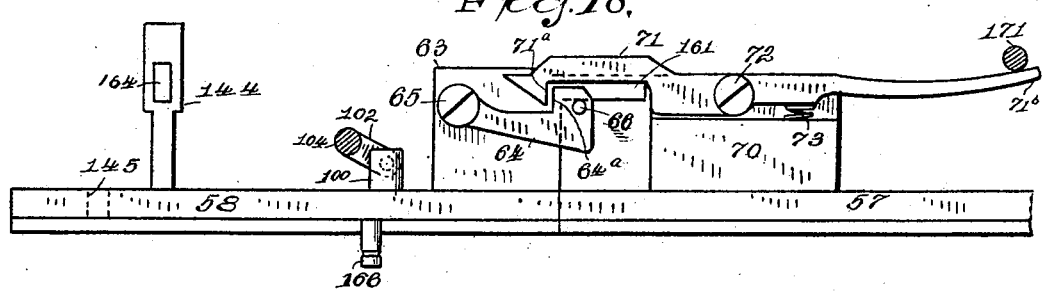
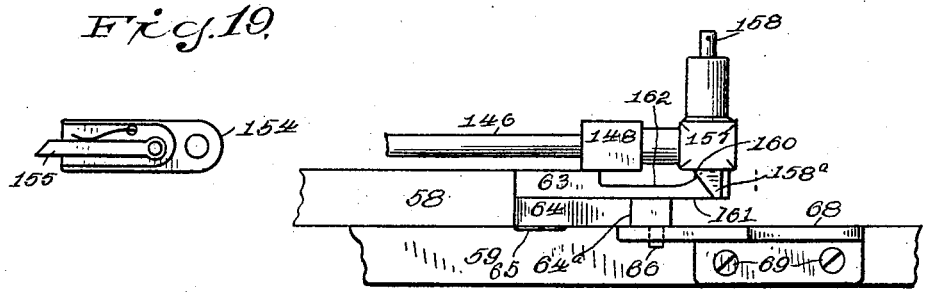
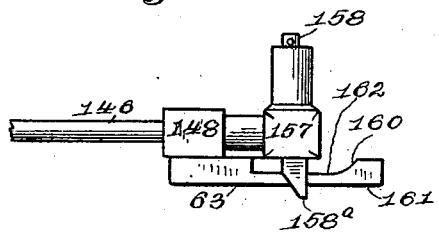
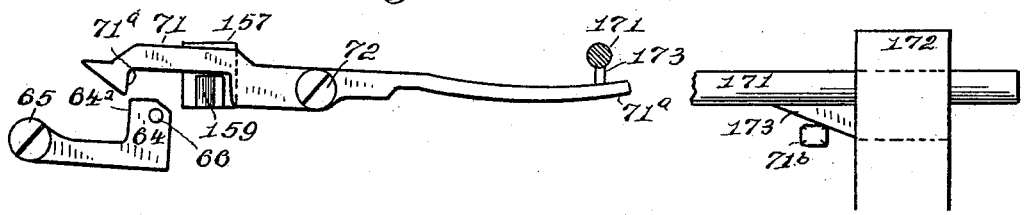
WITNESSES
H. H. Pauls
M. J. Keque
INVENTOR
Clarence Sterling.
By his Atty.
Geo. O. Phillips.

No. 618,915. Patented Feb. 7, 1899.
C. STERLING.
MOTOR VEHICLE.
(Application filed Dec. 21, 1897.)
(No Model.) 11 Sheets—Sheet 10.
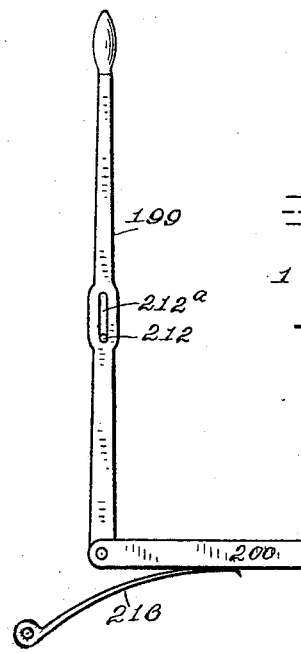
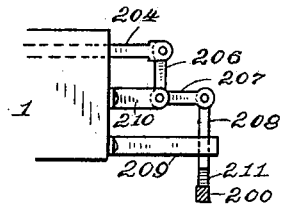
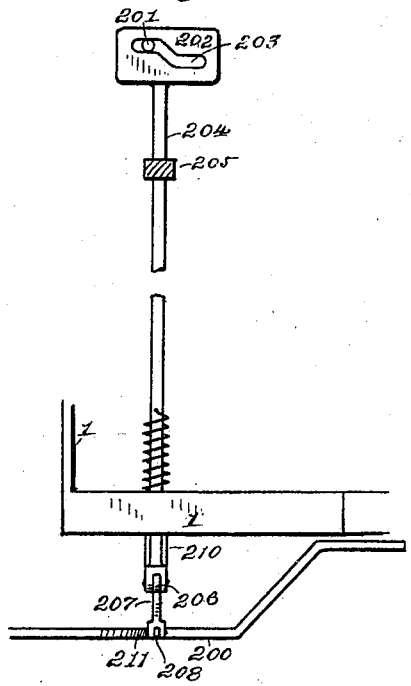
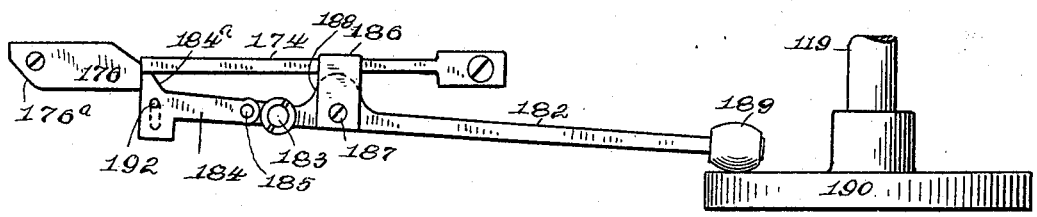
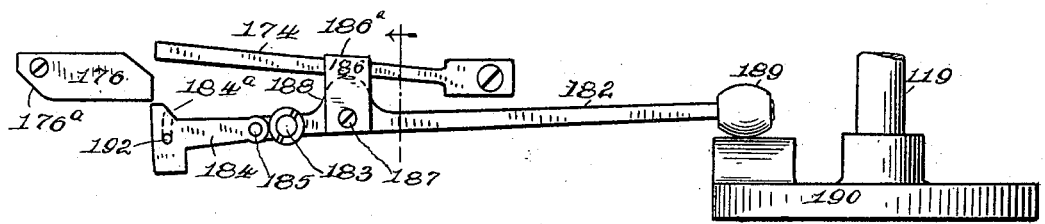
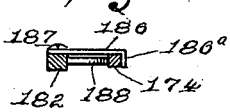
WITNESSES
INVENTOR
Clarence Sterling.
By his Atty.
Geo. D. Phillips.
THE NORRIS PETERS CO., PHOTO-LITHO., WASHINGTON, D. C.

No. 618,915. Patented Feb. 7, 1899.
C. STERLING.
MOTOR VEHICLE.
(Application filed Dec. 21, 1897.)
(No Model.)  11 Sheets—Sheet 11.
Fig. 31.
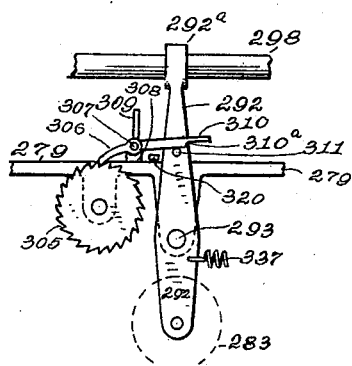
Fig. 32.
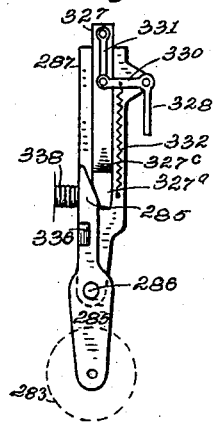
Fig. 33.
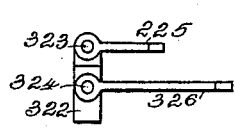
Fig. 36
Fig. 34.
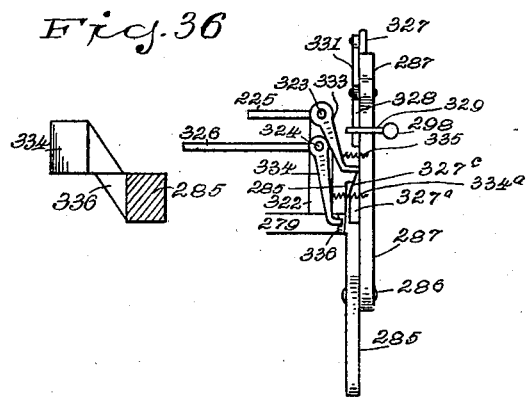
Fig. 35.
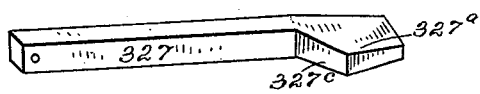
WITNESSES
H. A. Lamb
M. J. Keane
INVENTOR
Clarence Sterling.
By his Atty.
Geo. D. Phillips.

ically-movable clutch-frames 19
UNITED STATES PATENT OFFICE.

CLARENCE STERLING, OF BRIDGEPORT, CONNECTICUT.

MOTOR-VEHICLE.

SPECIFICATION forming part of Letters Patent No. 618,915, dated February 7, 1899.

Application filed December 21, 1897. Serial No. 662,833. (No model.)

*To all whom it may concern:*

Be it known that I, CLARENCE STERLING, a citizen of the United States, and a resident of Bridgeport, in the county of Fairfield and State of Connecticut, have invented certain new and useful Improvements in Motor-Vehicles, of which the following is a specification.

This invention relates to an improvement in motor-vehicles; and it consists in certain details of construction to be more fully set forth and described in the following specification and such features as are believed to be new and novel particularly pointed out in the claims.

To enable others to understand my said invention, reference is had to the accompanying drawings, in which—

Figure 2:
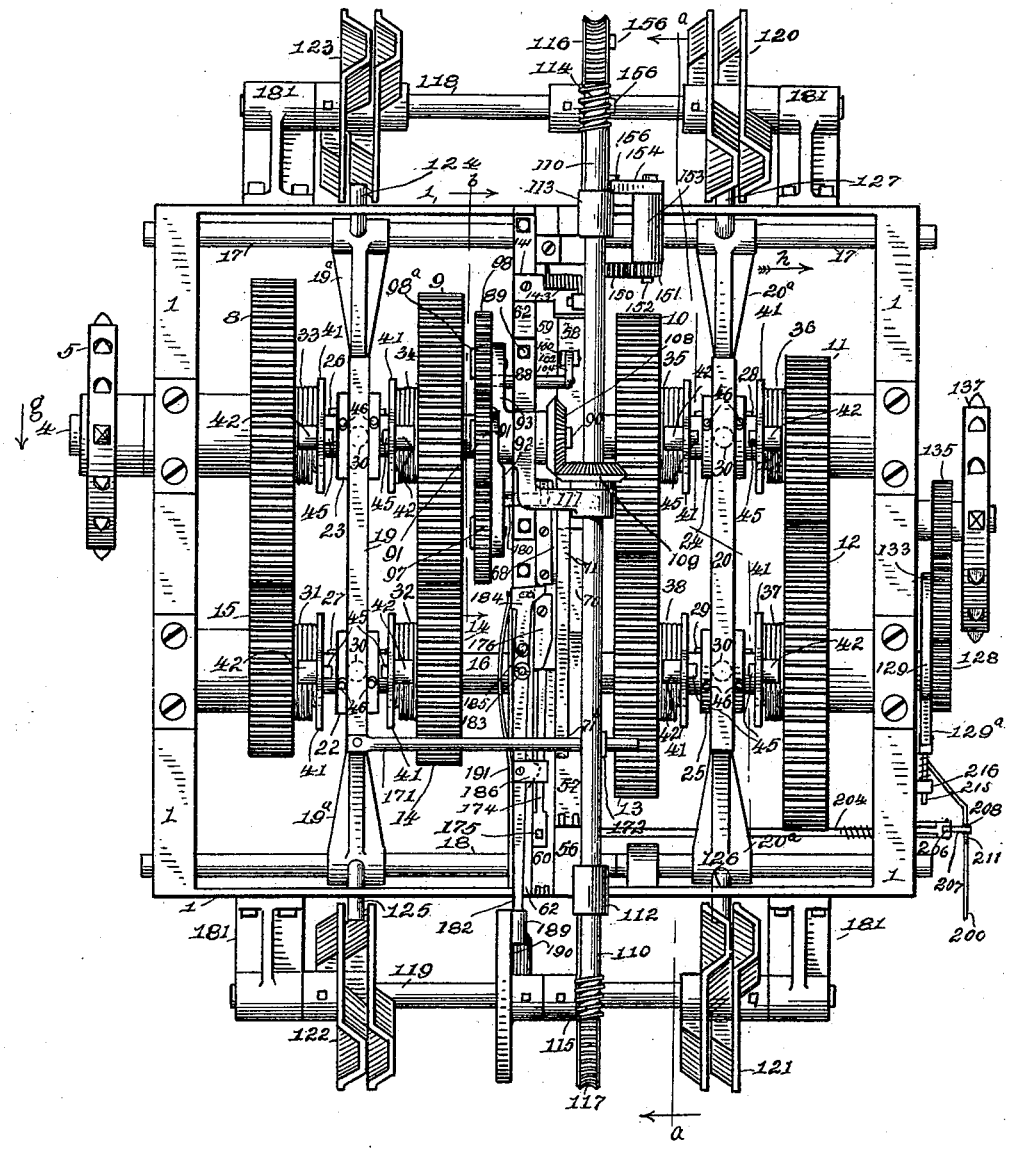
Figure 3:
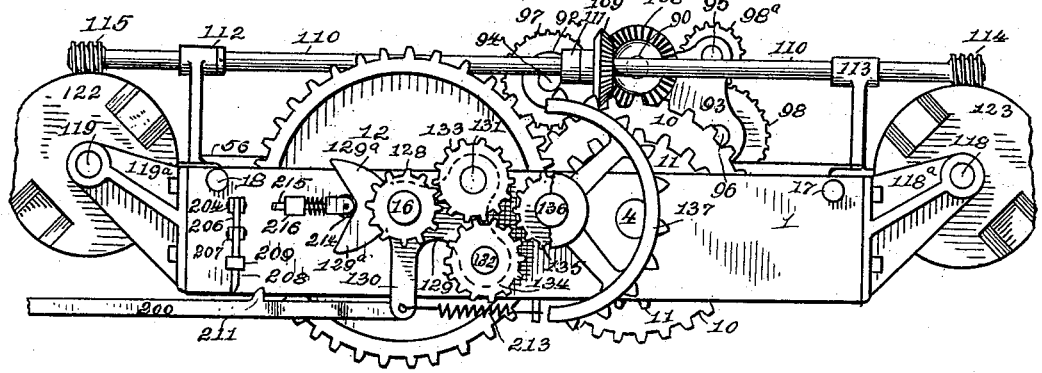
Figure 4:
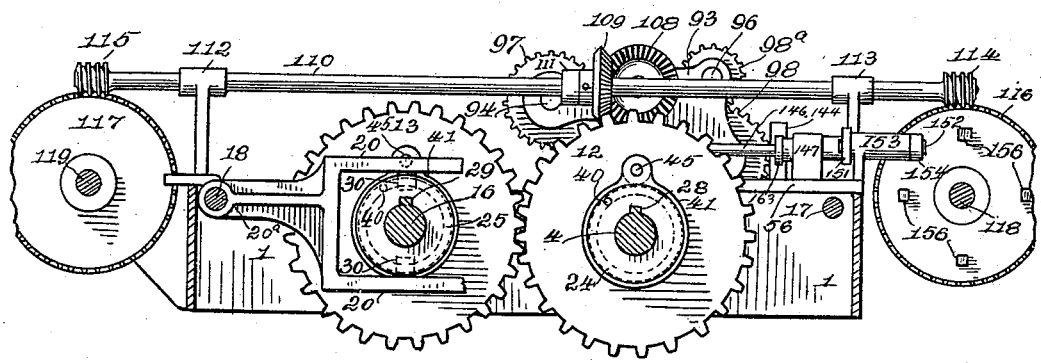
Figure 5:
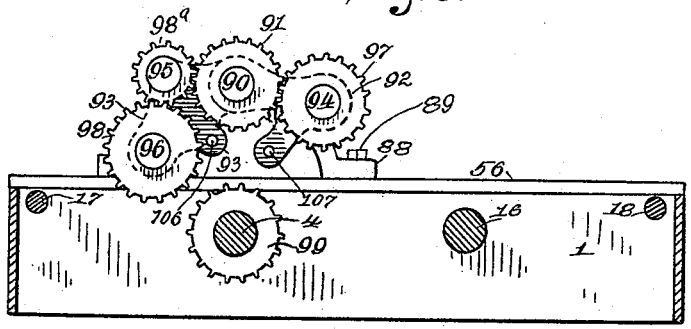
Figure 10:
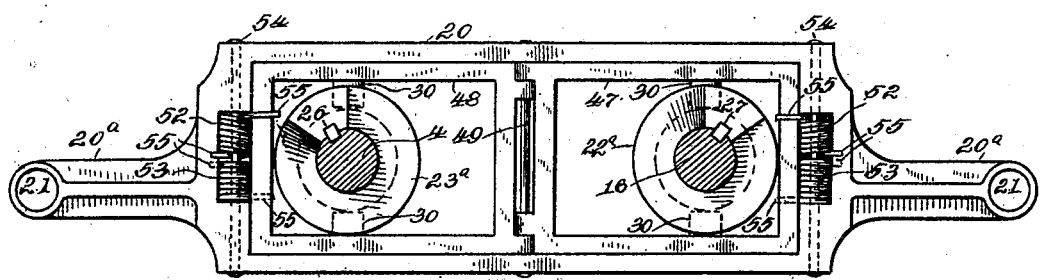
Figure 11:
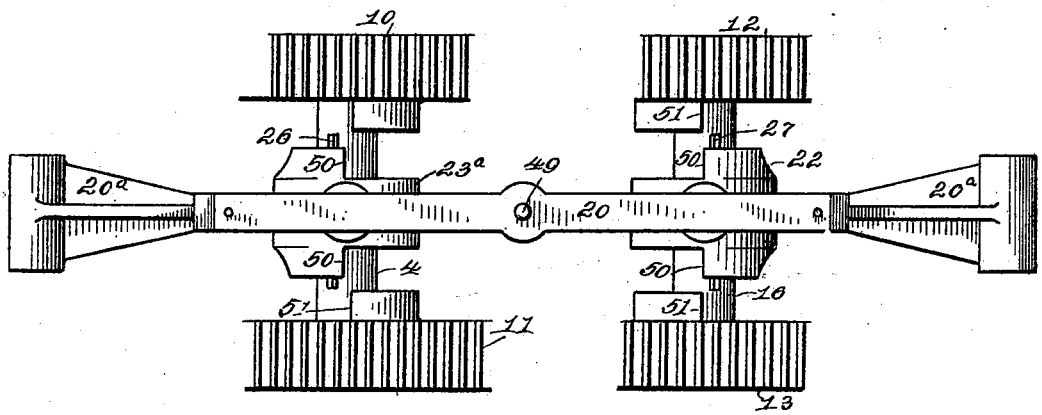
Figure 12:
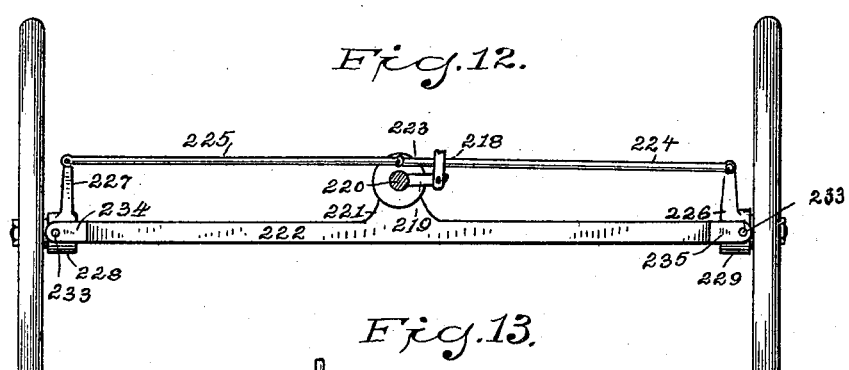
Figure 13:
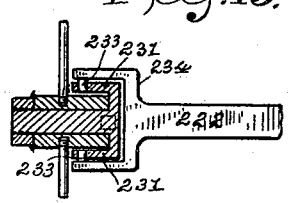
Figure 16:
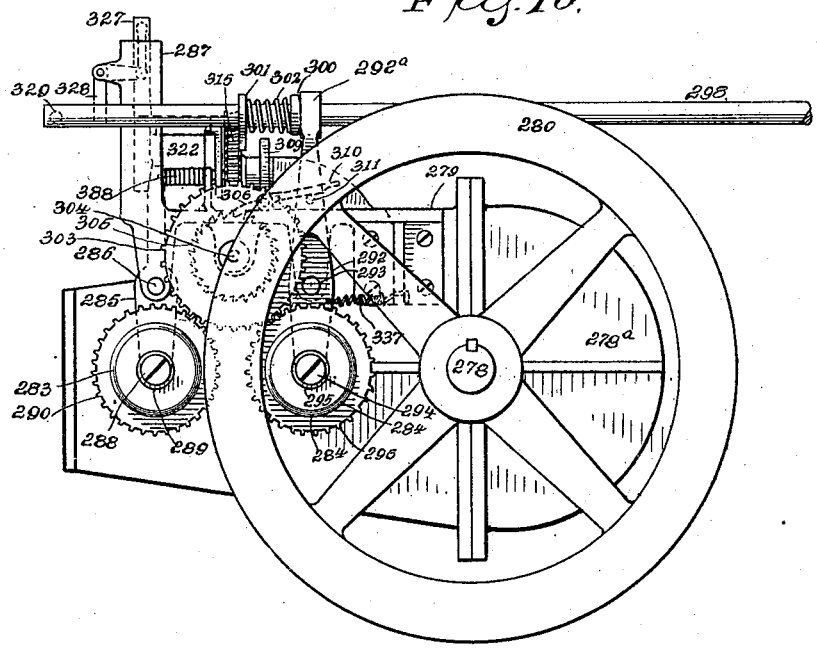
Figure 17:
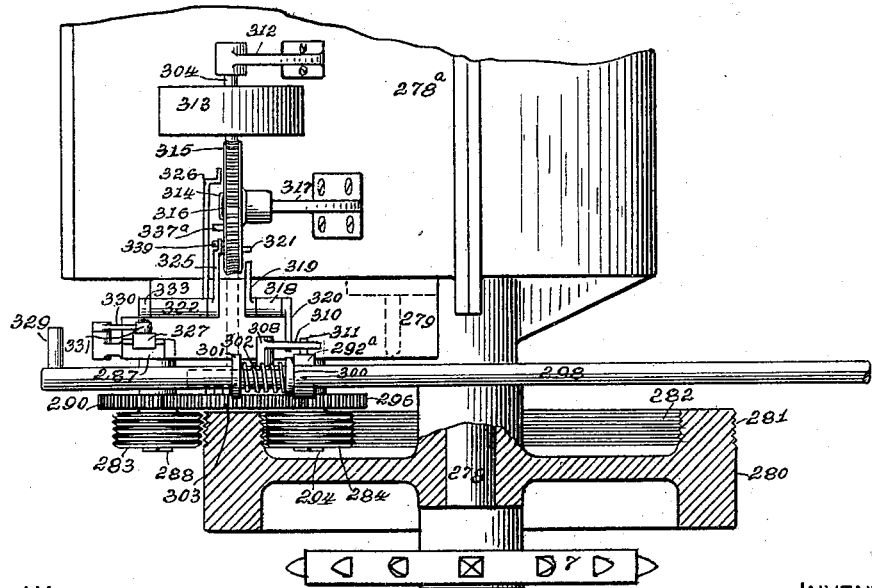

Figure 1 represents a broken side elevation, partly in section, of the vehicle, showing the internal propelling mechanism. Fig. 2 is an upper plan view of the transmitting mechanism. Fig. 3 is a side elevation of the frame containing the transmitting mechanism with a portion of the shifting or operating mechanism therefor removed. Fig. 4 is a sectional view through line *a* of Fig. 2 with most of the shifting or operating mechanism removed, also a broken view of one of the spring-clutch-driver-frames. Fig. 5 is a sectional view of the transmitting-mechanism frame on the line *b* of Fig. 2, showing the tumbler-gears adapted to be brought into engagement with a gear on the driving-shaft for changing the speed and reversing the same. Fig. 6 is a detail upper plan view of the mechanism for operating the speed mechanism. Fig. 7 is a detail side elevation of the mechanism shown at Fig. 6. Fig. 8 is an upper plan view of the vehicle and a sectional view of the body above the motor or between the motor and the transmitting mechanism. Fig. 9 is a detail side elevation of one of the clutch-spring devices, a broken view of the clutch-spring, and one of the driving-gears. Fig. 10 is a detail side elevation and sectional view of the two main gear-shafts and a modified construction of clutch mechanism mounted in one of the clutch-carrying frames. Fig. 11 is a detail upper plan view of the device shown at Fig. 10 and a broken view of the four gears with which the clutches are adaped to be brought into engagement. Fig. 12 is a detail upper plan view of the front axle and wheels therefor, showing the mechanism for operating said wheels to steer the vehicle. Fig. 13 is a broken detail view of the front axle-bar, a sectional view of the axle and hub, and a broken view of two of the wheel-spokes. Fig. 14 shows detail side elevations of the speed-shifting handle-slide and bell-crank levers connecting with the several operating-rods. Fig. 15 is a broken detail perspective view of the steering-post, with the operating handle-slide mounted on right-angle bend of such post, showing also the bell-crank-lever connections. Fig. 16 is a detail side elevation of a device adapted to operate by means of the power stored up in a spring for giving an initial turn to the balance-wheel for starting the engine, also a section of the motor or engine frame. Fig. 17 is an upper plan view of the device shown at Fig. 16. Figs. 18, 19, 20, 21, 22, 23, 24, 25, 26, 27, 28, 29, and 30 are detail views of the mechanism connected with the shipping or operating mechanism connected with the transmitting mechanism. Figs. 31, 32, 33, 34, 35, and 36 are detail views connected with the spring starting device shown at Figs. 16 and 17.

Its construction and operation are as follows:

The transmitting mechanism (see Figs. 1 and 2) is mounted in the rectangular frame 1, which frame is supported from the bottom 3 of the vehicle and directly over the motor, presently to be more fully described.

4 is the main driving-shaft journaled in the frame 1 and carrying on its outer projecting end the sprocket-wheel 5, whose chain 6 engages also with the sprocket-wheel 7 of the motor. 8, 9, 10, and 11 are variable driving-gears loosely mounted on said shaft, and they register with the different-sized gears 12, 13, 14, and 15, loosely mounted on the counter-shaft 16.

17 and 18 are fixed shafts passing through each end of the frame 1, which shafts support the laterally-movable clutch-frames 19 and 20. These clutch-frames are of rectangular shape (see also modification of the clutch mechanism shown at Figs. 4 and 10) to embrace the shafts 4 and 16, while their ends 19ᵃ and 20ᵃ have holes 21 therethrough to loosely embrace said drafts. 22, 23, 24, and 25 are spring-clutch-driver sleeves adapted to move longitudinally on such shafts, but prevented from rotating independent thereon by means of the keys 26, 27, 28, and 29. The usual circular grooves are formed in the surface of such clutch-driver sleeves, one of which grooves, $22^a$, is shown at Fig. 9 to receive the governing-pins 30, projecting inward from the upper and lower walls of the said clutch-frames.

On the shafts 4 and 16 are four collars fixed or integral therewith, one of which, $30^a$, is shown at Fig. 9, and around these collars are coiled (see also Fig. 2) the spring-clutches 31, 32, 33, 34, 35, 36, 37, and 38, and they are held normally out of engagement with such collars. As all of these springs are exactly alike the same figure of reference will when practicable be used. The inner end 39 of these coiled springs (see enlarged detail view Fig. 9) is anchored in the vertical face of the gear, while the other end 40 is anchored in the plate 41. This plate, of which, it will be understood, there are eight in number, loosely embraces the shafts 4 and 16 and rests against the face of several collars. Projecting inward from the vertical face of the said plates are the housings 42, inclosing springs, one of which springs, 43, is shown at Fig. 9. The head 44 of the pin 45 rests against the end of the spring, while the body portion passes through a hole in the face of the plate to engage with the clutch-driver pins 46. Now it is evident that when the spring-clutch-driver pin 46 is brought against the body of the pin 45 it will cause the plate in which it is placed to partially rotate and tighten the clutch-spring about the collar on the same and rotate the gear, and as the spring-clutch when in its normal open position just clears the hub the plate 41 will not have to turn but a small fraction of a revolution before a firm and absolutely unyielding grip will be exerted on said collar and rotate the gear therewith. The coil-spring 42 will prevent the breaking of the clutch-sleeve-driver pins in case they should strike against the end of the pin 45, in which case the said pin will simply be forced within its housing until the rotary movement of the clutch-sleeve has carried its driver-pins in the rear of the said plate-pin. To still further obviate this trouble, said pin 45 may be pointed, as shown at Fig. 9.

The modified construction of the clutch mechanism shown at Figs. 10 and 11 consists of the doors 47 and 48, pivotally supported on the central pin 49, passing transversely through the frame 20. The clutch-sleeves $22^a$ and $23^a$ are provided with the ordinary clutch-faces 50 to engage the clutch-faces 51 of the gears. The studs or pins 30 for moving the clutch-sleeves along their respective shafts are in this case located in the upper and lower walls of the rectangular doors 47 and 48, while, as before mentioned, in the other construction they are located in the frame 20. 52 and 53 are the door-springs, located within recesses of the frame and are held in position by the pins 54. The free ends 55 of these springs engage both the frame and doors, so as to place said doors under the influence of such springs. The springs and doors perform the same function as the spring-pins of the plate before mentioned, so that should the clutch-faces of the sleeves and gears fail to engage when said sleeves are brought against the hubs of the gears the doors will swing slightly in the opposite direction, and during this swinging movement the rotating shafts carrying the clutch-sleeves will have turned sufficient to enable the clutch-faces to engage, which operation will prevent breaking the operating mechanism controlling and operating the said clutch-sleeves.

The frames 19 and 20 are operated as follows: 56, Figs. 2, 6, and 7, is a cross-piece mounted on the top of the main frame 1 and central therewith. This cross-piece supports the operating devices for controlling the mechanism of the said frames 19 and 20 of the power-transmitting mechanism. 57, 58, 59, and 60 are bars that have a longitudinal movement in said cross-piece and are operatively secured thereto by the caps 61 and 62.

63, Figs. 6, 7, 18, and 20, is a block secured to the forward end of the sliding bar 58, carrying the latch 64, pivotally supported to the vertical face of said block by the screw 65. Near the free end of this latch is the laterally-projecting pin 66, adapted to engage with the cam-slot 67 of the plate 68, which plate is mounted on the sliding bar 59 and secured there by means of the screws 69.

70 is a block mounted on the sliding bar 57 and carries the operating-pawl 71. 72 is a screw on which the said pawl is pivoted, and 73 is a spring placed beneath such pawl and forward of its pivotal support to keep the hook portion $71^a$ depressed in readiness to engage with the hook portion $64^a$ of the latch 63.

In Figs. 1 and 15 is shown the vertical steering-post 74, having the forward-projecting arm 75. 76 is a slide mounted on this arm and is provided with the handle 77. Bell-crank levers 78, 79, 80, and 81 are pivotally supported on each side of the said steering-post. (See also Fig. 14.) 82 and 83 are rods connecting the handle-slide 76 with the bell-crank levers 78 and 80, and 84 and 85 are rods which connect the lower bell-crank levers 79 and 81 with the sliding bars 57 and 60. (Shown at Figs. 2 and 6.)

86 and 87 are chains connecting the upper and lower bell-crank levers.

The transmitting mechanism (shown at Fig. 2) is in its normal position, or, in other words, at zero, with all of the clutch-drivers out of contact, while the driving-shaft is running in the direction of arrow $g$, under the influence of the motor. To start the vehicle, the handle-slide 76, Fig. 15, is pulled back in the direction of arrow $d$. This will draw the rod 84 in the direction of arrow $c$. This operation will also move the sliding bar 57 and also the bar 58 forward through the medium of the pawl 71 and the latch 64. Mounted on the cross-piece 56 is the standard 88 (see Figs. 2 and 5) and is secured thereto by the bolts 89. In Figs. 3, 4, and 5 this cross-piece is not shown very clearly. Mounted in this standard is the short shaft 90, and rigidly secured to this shaft is the intermediate gear 91, while the two arms 92 and 93 are adapted to turn thereon. These arms carry the studs 94, 95, and 96, (see also Fig. 3,) on which studs are loosely mounted the tumbler-gears 97 and 98, adapted to be alternately brought into contact with the fixed gear 99 on the driving-shaft 4, Fig. 5, 98$^a$ being an intermediate gear on the stud 95.

100, Figs. 2, 6, 18, and 7 are ears mounted on the sliding bar 58. 102 is a link pivoted to these ears and carrying the pin 104, whose outer end is secured in the hole 106 of the tumbler-gear arm 93 (Shown at Fig. 5.)

Drawing the sliding bars 57 and 58 forward, as before mentioned, will carry the tumbler-gear 98 into engagement with the gear 99 on the shaft 4. This will rotate the short shaft 90, and through the medium of its bevel-gear 108 and the bevel-gear 109 on the shaft 110 will also cause such shaft to rotate. This shaft is centrally supported in the arm 111 of the standard 88 and also in the end standards 112 and 113. The worms 114 and 115, Fig. 2, meshing with the worm-wheels 116 and 117 on the cam-shafts 118 and 119, will, through the rotation of the worm-shaft 110, cause such cam-shafts to rotate. 120, 121, 122, and 123 are cams mounted on said cam-shafts, with which the pins 124, 125, 126, and 127 of the clutch-driver-carrying frames 19 and 20 engage.

The forward movement of the sliding bars 57 and 58 will through the medium of the mechanism just described cause the clutch-driver-carrying frame 20 to slide on the cross-rods 17 and 18 in the direction of arrow $h$ and effect the engagement of the clutch mechanism before described and rotate gears 11 and 12, which gears represent the slowest movement, or, in other words, imparting a speed to the vehicle of about four miles per hour.

On the projecting end (see Figs. 1, 2, and 3) of the counter-shaft 16 is the gear 128, and 129 is a plate loosely mounted on such shaft, which plate has the downward-projecting arm 130 to connect with operating mechanism presently to be more fully described. This plate carries the studs 131 and 132, and upon which studs are loosely mounted the gears 133 and 134 to register alternately with the gear 135, loosely mounted on the fixed stud 136, projecting from the frame 1. Loosely mounted on this stud and rigidly secured to the gear 135 is the sprocket-wheel 137, whose chain 138 engages with the sprocket-wheel 139, mounted on the wheel-hub of the rear axle 140, whereby the vehicle is impelled forward or backward, as the case may be.

Referring to Figs. 6 and 7, 141 is a block secured to the cross-piece 56, and 142 is a pin projecting from such block, which pin supports the coiled spring 143, set into a jog of said block. The free end 143$^a$ rests against the vertical face of such block, while the other free end 143$^b$ engages with the sliding bar, locking-pin 144 operating in the hole 145 in the forward part of the sliding bar 58. The lower end of this locking-pin rests (see also Fig. 18) on the upper surface of the sliding bar 58, so that when said bar is pulled forward, as before described, the coiled spring 143 will force the end of said locking-pin into the hole 145 of said bar, thus locking said bar in such forward position. Now as the forward movement of the sliding bar has brought the tumbler-gear 98 into engagement with the gear 99 of the driving-shaft 4, and thereby set in motion the mechanism that has carried the spring-clutch-driver-carrying frame 20 into the position previously described, it is quite evident that unless this tumbler-gear is thrown out of engagement with the gear 99 of the driving-shaft the cam-shafts 118 and 119 will continue to rotate until the opposite throw of the cams 120 and 121 will carry the said clutch-drivers 24 and 25 out of engagement with the clutch-spring mechanism of the gears 11 and 12. To prevent this, the short shaft 146 (see Figs. 6 and 7) is rotatively mounted in the standards 147 and 148 of the cross-piece 56. 150 is a segment-gear mounted on said shaft, which gear registers with the segment-gear 151, (see also Fig. 2,) mounted on the short shaft 152, which shaft is in turn rotatively mounted in the standard 153. 154 is a plate (see also Fig. 19) carrying on its sunken face the spring-actuated pawl 155, adapted to engage the four lugs 156 on the vertical face of the worm-gear 116. (Shown also at Fig. 4.)

On the opposite end of the shaft 146 is rigidly mounted the piece 157, Figs. 6, 7, 20, 21, 22, and 23, carrying the spring-pin 158, and projecting from the enlarged head of this spring-pin is the taper-finger 158$^a$. 159 is a beveled face of the said head below such taper-finger to engage with the taper-face 160 of the finger 161, projecting from the latch-block 63. When the pawl 71 is down or engaged with latch 64, as shown at Fig. 18, the end of the spring-pin finger 158$^a$ will be close to the outer face of said pawl. Now when the worm-gear 116 has turned a quarter of a revolution, or until one of its lugs 156 engages with the pawl 155, it will rock the shaft 146. In the meantime it will of course be understood that the forward movement of the sliding levers 57 and 58 has carried the latch-block 63 forward also until the recess 162 of the finger 161 is brought opposite the spring-pin, which will allow such pin to project forward, as shown at Fig. 21, and as the outer face of the pawl is beveled the finger 158ᵃ of said spring-pin will slip under said pawl and by the rocking motion of the shaft 146, before mentioned, will lift said pawl and disengage it from the latch 64, as shown at Fig. 23. In the meantime the collar 163, rigidly mounted on shaft 146 and near its opposite end, whose finger 163ᵃ, enters the square hole 164 of the locking-pin 144, will draw such pin out of the hole 145, Fig. 18, of the sliding bar 58. To supplement the operation, 58ᵃ, Figs. 6 and 7, is also a bar attached to a right-angle portion of the block 141 by means of the screw 58ᵇ, and it is provided with the spiral 58ᶜ, which spiral will engage the under side of the finger 163ᵃ, which will be sure to lift the said pin 144 should the other mechanism just described fail. This operation will release such bar and place it under the control of the spring 165, Fig. 7, below the cross-piece 56. This spring is connected by one end to the post 166, attached to the said sliding bar, while the post 167 is fastened to the said cross-piece. Releasing the handle-slide 76, Fig. 16, will place the sliding bar 57 under the control of the spring 168, attached to the posts 169 and 170, Fig. 7, and carry the pawl 71 forward in readiness to reëngage with the latch 64. As the rocking movement of the shaft 146 is of short duration the engagement of the finger of the spring-pin 158 with said pawl is just long enough to enable said pawl to clear the latch, whereupon said pawl will drop into its normal horizontal position.

To attain the next highest speed—eight miles per hour—the handle-slide 76 is operated precisely as before, which of course will set in motion the same mechanism as before described and with the same result. The swell on the opposite side of the cam 120 will carry the clutch-driver-carrying frame 20 over to the gears 10 and 13. The next operation of the handle-slide 76 will carry the clutch-driver-carrying frame 19 toward the gears 9 and 14, representing a speed of twelve miles per hour, and the next movement of such handle-slide will carry the frame 19 toward the gears 8 and 15, representing the highest attainable speed of sixteen miles per hour.

When the speed controlling or operating mechanism has placed the vehicle at the highest speed, it is absolutely necessary that it should be so protected as to prevent its being further manipulated; otherwise if the sliding bars 57 and 58 be operated while the frame 19 is over against the gears 8 and 15 the next forward movement of such bars would cause the frame 20 to be carried toward the gears 11 and 12, and with all of the spring-clutches thus engaged something would break. To obviate this, the rod 171, Figs. 2, 6, 7, and 24, is pivotally supported to the clutch-sleeve-carrying frame 19 by one end, while its other end is made longitudinally adjustable in the standard 172, projecting from the cross-piece 56. 173 is a taper-piece attached to the under side of the rod 171 and adapted to slide into a slot formed in the standard 172. Now when the frame 19 is carried to the extreme left position it will carry the rod 171 with it, and as the tailpiece 71ᵇ of the pawl 71 is always under such rod the taper-piece 173 will be brought against the beveled face on said tailpiece and depress the same, so as to lift the pawl-face 71ᵃ out of contact with the latch 64 (see also Fig. 23) and keep it elevated, so that the sliding bars 57 and 58 cannot be further operated. Now it is quite evident that any further movement of the handle-slide 76, Fig. 16, in the direction of arrow $d$ will have no effect on the transmitting mechanism. Therefore the only movement of this slide that will effect such mechanism is in the direction of arrow $e$, which of course will actuate the connecting-rod 85 in the direction of arrow $f$ and, as a matter of course, move the sliding bar 60 in the same direction.

On the sliding bar 60, Figs. 2 and 6, is the pusher-rod 174, pivotally supported thereto by the bolt 175. The end of this rod abuts against the end of the short plate 176, which plate is pivotally supported to the sliding bar 59 by means of the screw 177. (Seen more clearly at Fig. 6.) Forward of this short plate and projecting from the sliding bar 59 are the ears 178, carrying the link 179, and 180 is a pin attached to such link adapted to enter the hole 107, Fig. 5, provided in the arm 92. This forward movement of the said sliding bars just described will of course bring the gear 97 into engagement with the gear 99 of the driving-shaft 4, and thereby cause a reverse movement of the worm-shaft 110 and will of necessity reverse the operation of the cam-shafts 118 and 119, mounted in the end standards 181, which operation will also reverse the movement of the cams mounted thereon and cause the spring-clutch-driver-carrying frames 19 and 20 to follow the same path in their retrograde movement as they did in their forward movement until they have been returned to zero, or, in other words, to the position they occupy at Fig. 2. When, therefore, the sliding bar 59 has been pushed forward far enough to effect this return movement just described, it is necessary that it should be held there until such movement is fully completed. To effect this, the lever 182, Figs. 2, 6, and 7, is used, which lever is pivotally supported to the stud 183, projecting from the cross-piece 56, and such lever carries the pawl 184, pivotally supported on the pin 185 of the said lever. 186 (see also Figs. 25, 26, and 27) is a plate pivotally supported to the lever 182 by the screw 187. This plate has a downward-projecting end 186ᵃ, that embraces the outside edge of the pusher-rod 174. 188 is a cam projection on the edge of the lever 182 and directly under the plate 186, which cam is adapted to engage with the opposite edge of said pusher-rod. 189 is a roller on the outer end of the lever 182, adapted to engage with the face-cam 190 on the cam-shaft 119. When, therefore, the said pusher-rod is carrying the sliding bar 59 forward to reverse the action of the tumbler-gears before mentioned, the beveled edge 176ª of the plate 176, acting against the beveled edge 184ª of the pawl 184, will cause such pawl to swing on its pivotal support, and when the said sliding bar has reached the limit of its forward movement the projecting end of said pawl will drop back under the influence of the spring 191, Fig. 2, and effectually support said sliding bar in its forward position, as shown at Fig. 25. When, therefore, the transmitting mechanism before mentioned has returned to zero, with all of the gears on the two shafts 4 and 16 idle, then the cam 190 will actuate the lever 182, so as to carry the pawl 184 out of engagement with the end of the plate 176, the limit of such lateral movement being determined by means of the pin 192 of said pawl projecting into an elongated slot in the said lever. This movement of lever 182 will, through the medium of its cam projection 188, force the pusher-rod 174 also out of engagement with the end of the plate 176, as shown at Fig. 26. The sliding bar 59 being thus released, it will return to its normal position (shown at Figs. 2 and 6) under the influence of the spring 193, Fig. 7, which spring is attached to the post 194 of the cross-piece 56 and the post 195 of said bar. 196 is a spring attached to the post 197 of the bar 60 and the hook 198, attached to the frame 1, whereby the sliding bar 60 is also returned to its normal position. It will be understood that there are elongated holes (not shown) in the cross-piece 56 for the studs attached to the several sliding bars to operate in, and the engagement of such studs with one end of the said slots will establish the normal position of said bars. When the pusher-rod 174 and the pawl 184 are in the position shown at Fig. 26, they will remain in such position until the bar 59 has returned, when the cam 190 will actuate the lever 182 and return such lever to its normal position, and this movement of said lever will bring the pusher-rod against the end of the plate 176 and under the projecting end of the pawl 184, this return movement of the said pusher-rod being effected by means of the downward-projecting end 186ª of the plate 186. (Shown at Fig. 27.)

The arm 130 of the reversible gear-plate 129, Figs. 1 and 3, is pivotally supported to the handle-lever 199 by means of the lever 200, whereby the forward or reverse movement of the vehicle is effected.

As the clutch-driver-carrying frames will have to travel in the same path on returning back to zero as they did in advancing, it will require an appreciable amount of time to accomplish this retrograde movement, while it may be desirable to sever instant connection with the running-gear of the vehicle. To effect this, the stud 201, Figs. 7 and 28, is secured to the sliding bar 60, projecting through an elongated slot in the cross-piece 56. 202 is a cam-plate having the cam-slot 203 therein to engage with the stud 201. 204, Fig. 2, is a rod attached to this cam-plate, which rod is supported in the bracket 205, projecting downward from the cross-piece 56 and in the side of the main frame 1. The outer projecting end of this rod (see also Figs. 3 and 29) connects with the bell-crank lever-arm 206, while the other arm 207 of said lever connects with the vertically-operating rod 208, supported in the bracket 209, the bell-crank lever being supported in the bracket 210. On the upper edge of the horizontal lever 200 is the lug 211, with which the lower end of the vertical rod 208 is adapted to engage. When, therefore, the handle-lever 199, which lever is pivotally supported on the pin 212, (see also Fig. 30,) is pulled back, it will carry forward the lever 200 and cause the engagement of its lug 211 with the vertically-operating rod 208, and such lever will remain thus locked in its forward position until the sliding bar 60 is operated, as before mentioned, whereupon the pin 201, projecting from such bar and operating in the cam-slot 203, will cause an inward movement of the rod 204 sufficient to elevate the rod 208, and thus release the lever 200, placing it under the control of the retractile spring 213, Fig. 3. This will throw the gear 133 out of mesh with the sprocket stud-gear 135, as shown, and thus permit an instantaneous application of the brake to overcome the inertia of the vehicle.

To prevent the lever 200 being carried back too far, so as to throw the gear 134 in register with the sprocket-wheel stud-gear, and thereby reverse the vehicle, the extension 129ª of the gear-plate 129, Fig. 3, is provided with the V-shaped end, as shown, adapted to engage with the roll 214 in the forked head of the spring-pin 215, which spring-pin is operatively mounted in the bearing 216, projecting from the side of the frame 1. When necessary to reverse and run the vehicle backward, the operator will simply hold the gear 134 in register with the sprocket-gear 135 by means of the handle-lever 199. Forcing back the lever 200 to effect this reverse action will turn the gear-plate 129 on the stud 16, and this rotary movement will force the spring-pin roll 214 back, so that it will travel on one of the inclined faces of said plate, and when said lever is released said roll will fall into the apex of the V-shaped end of said plate and hold gears 133 and 134 out of contact with gear 135. In the forward movement of the lever 200, as before stated, its lug 211 and the rod 208 will engage to hold the said lever in such forward position.

As before stated, the lever 200 is released by the forward movement of the sliding bar 60; but if required to throw back this lever independent of such bar it is done by means of the handle-lever 199. Said lever is forced downward against the spring 216, Figs. 1 and 30, whose free end rests against the under side of the forward end of such lever, the other end of such spring being rigidly secured to the body of the vehicle or to any other convenient and stationary object about the vehicle. This downward movement of said handle-lever will liberate the lug 211 from the end of the rod 208, when the lever 200 will be returned by means of its spring 213, as previously mentioned. The elongated slot 212$^a$ in said lever will permit of this vertical movement of the handle-lever, while the spring 216 will carry the said lever up again to its normal position as soon as the hand is released therefrom.

From the foregoing description it will readily be seen that the factor of safety is very low as to the matter of handling the vehicle, as the hand of the operator is always in contact with the handle portion 77, Figs. 1 and 16, of the slide 76 in order to steer the vehicle by turning the rod or post 74, presently to be described. It is evident that when such slide is longitudinally operated to change the speed no further increase of speed can be effected unless the slide is returned to its normal position again, while a movement of the slide in the opposite direction will surely stop the vehicle, so that should the operator become excited he is far more apt to stop the vehicle entirely than increase the speed, and the restarting is always at the lowest speed.

The steering apparatus consists of the rod or post 74, Figs. 1 and 8. 217 is an arm rigidly connected to the lower end of the post 74, and 218 is a rod having one end pivotally supported to this arm and the other end (see also Fig. 12) to the arm 219 of the forward vertical rod 220. This short rod is journaled in the vehicle-body and in the arm 221 of the axle-bar 222.

223 is a circular plate rigidly mounted on the rod 220, and 224 and 225 are rods pivotally supported to this plate. The other ends of such rods are pivotally supported to the arms 226 and 227 of the hubs 228 and 229, whereby such hubs and wheels are turned through the medium of the steering-rod 74 and the intervening mechanism just described.

The axles 230 (see also Fig. 13) are each provided with the return-flange portion 231, adapted to be pivotally supported to the pins 233, projecting within the forked ends 234 and 235 of the axle-bar. This return-flange of the axle will bring the pivotal point of the wheels closer to the spokes 236 or center of the wheel, thereby greatly reducing the strain on such pivotal points.

In Figs 8, 16, and 17 (more particularly the two latter figures) is seen a device for starting the motive power. 278 is the crank-shaft projecting without the engine-frame housing 278$^a$. 280 is the balance-wheel mounted on said shaft, as is also the sprocket-wheel 7. On the outer and inner circumference of the flange of this wheel are formed a series of V-shaped grooves 281 and 282, with which the grooved wheels 283 and 284 are alternately adapted to engage. 285 is a lever pivotally supported on the stud 286, projecting from the upright 287. 288 is a stud on the lower end of this lever, and 289 is a bushing rotatively mounted on such stud, and rigidly secured to this bushing are the gear 290 and the grooved pulley 283, adapted to engage with the grooves 281 in the outer circumference of the balance-wheel. 292 is another lever pivotally supported on the stud 293, projecting from the under side of the bracket 279. 294 is a stud in the lower end of this lever carrying the bushing 295, on which bushing are rigidly secured the gear 296 and the grooved pulley 284 to engage with the grooves 282 on the inside of the rim of said balance-wheel. The opposite end 292$^a$ of this lever is forked to embrace the operating-rod 298, which rod extends through to the front part of the vehicle and is provided with the handle portion 299. Back of the forked end of said lever are the collar 300 and the trip 301, rigidly secured thereto and between which is placed the spring 302. 303 is a gear rigidly attached to one end of the rod 304 and adapted to register with the gears 290 and 296. On this rod and close to the gear 303 is the ratchet-wheel 305. 306 is a pawl mounted on the short shaft 307, (see also enlarged view, Fig. 31,) which shaft is supported in the standard 308, projecting from the horizontal surface of the bracket 279. 309 is a projection of the said pawl adapted to be engaged by the trip 301, Fig. 16, on the shaft 298. 310 is a finger or locking-arm pivotally supported on the shaft 307, having the seat 310$^a$ on its under surface to engage with the pin 311 on the lever 292 when said lever is actuated to bring its grooved pulley 284 into engagement with the grooved balance-wheel. The opposite end of the shaft 304 is journaled in the bracket 312, rising from the engine-frame. On this shaft are mounted the flat coiled steel spring 313 and the worm 314 to register with the worm-wheel 315, mounted on the short transverse shaft 316, journaled in the standard 317. 318 is a standard on the bracket 279, having a short shaft journaled therein, carrying the two arms 319 and 320, the former adapted to be engaged by the pin 321 on face of the worm-wheel 315 and the latter adapted to engage with the locking-arm 310 and lift it at the proper time.

322 (see also enlarged view, Fig. 32) is a standard rising from the bracket 279, with the two shafts 323 and 324 journaled therein, and on the end of these shafts nearest the worm-wheel are the arms 325 and 326. In the rear face of the upright 287 (see also enlarged views, Figs. 33 and 34) is the movable slide 327, having (see also Fig. 35) the flanged head 327$^a$ to project out far enough to allow its beveled face 327$^c$ to engage the beveled end of the swinging lever 285, so as to depress such lever and maintain it in its normal elevated position. (Shown more clearly at Fig. 33.) Pivotally supported on the upright 287 is a bell-crank lever, whose arm 328 is adapted to be engaged by the pin 329, Figs. 16 and 17, of the rod 298, while the other arm 330 is pivotally connected with the link 331, pivoted to the end of the slide 327, whereby said slide is moved in one direction and in the opposite direction by the spring 332. On the opposite end of shafts 323 and 324 of the standard 322, Fig. 34, are the arms 333 and 334, whose free ends have a right-angle bend or hook. The former of these arms rests against the outer surface of the slide 327 and is maintained there by the spring 335. The other lever overlies the projection 336 of the grooved pulley-lever 285, and also holds such lever in its normal elevated position. When the slide 327 is drawn back, its incline face 327°, Fig. 34, will force outward the arm 333, which arm will react by means of its spring and drop in front of the said slide to hold the same back.

Let it be supposed that the spring 313 is wound up and all of the mechanism just described in its normal position with both of the grooved pulleys out of engagement with the balance-wheel. Now to rotate said balance-wheel by means of the stored-up power in said spring the rod 298 is pulled, which will actuate the lever 292 and carry its grooved pulley into engagement with the grooves of the said wheel and at the same time lock it in such position by means of the lever 310 engaging the pin 311. After the lever 292 is thus locked a further pull of said rod will disengage the pawl 306 from the ratchet-wheel 305 and place the shaft 304 under the influence of the spring 313, causing the grooved pulley before mentioned to rotate and turn the balance-wheel one or two revolutions, which will suffice to start the engine. In the meantime the worm-wheel 315 will begin to rotate, and by the time the engine is started the pin 321 will engage the arm 319 and cause the arm 320 to elevate the locking-lever 310, as before mentioned, thus releasing the lever 292, so that its spring 337 will draw said grooved pulley out of engagement with the balance-wheel. The forward movement of the rod 298 will also operate the slide 327 of the upright 287, as before mentioned, locking it in its rear position by means of the arm 333. In the meantime the pawl 306, Fig. 31, is still held out of engagement with its ratchet-wheel by means of the forward position of the rod 298, and the worm-shaft will continue to turn in the same direction until the pin 337ª, Fig. 17, operates the arm 326, which will release the engagement of the arm 334 from the lug 336 of the lever 285, which lever will then be actuated by its spring 338, Fig. 33, and force the grooved pulley in contact with the balance-wheel, so as to rewind the power-spring 313, which operation will turn the worm-wheel, Fig. 17, in the opposite direction, and when the pin 339 engages the arm 325 it will withdraw the arm 333 from its engagement with the end of the slide 327, allowing such slide to move forward and engage the lever 285 to lift its grooved pulley from the balance-wheel. When, therefore, the inner end of lever 285 is being depressed, the beveled face of its locking-lug 336 will engage the beveled face of the arm 334, (see Fig. 36,) permitting them to pass each other until they are locked together by the spring 334ª, as shown. It will be understood that the engagement of the outer grooved pulley will take place so close to the disengagement of the inner one that the movements will be almost instantaneous, so that the rod 298 can be released as soon as its full forward movement has been completed.

I do not wish to be strictly confined to the exact details of construction of the various mechanical elements, as these can be changed in form or other well-known means substituted therefor without departing from the spirit of my invention.

Having thus described my invention, what I claim as new, and desire to secure by Letters Patent, is—

1. In a motor-vehicle, the combination with a motor, of power-transmitting mechanism for communicating power from said motor to said vehicle, consisting of a driving-shaft and a counter-shaft, support therefor, said shafts carrying normally loose gears of different diameters adapted to register together, collars rigidly secured to said shafts and in close proximity to said gears, a coiled spring about said collars and normally out of contact with the outer surface thereof, one end of said coils anchored to said gears, the other or free ends adapted to be engaged by rotatable sleeves carrying drivers, for the purpose set forth.

2. In a motor-vehicle, the combination, with a suitable motor, of transmitting mechanism for communicating the power from said motor to the vehicle, consisting of a driving-shaft and a counter-shaft, support therefor, said shafts carrying normally loose gears of different diameters, fixed collars on said shafts and in close proximity to said gears, a metal coil about said collars and normally out of contact therewith, one end of said coil connected with said gears, sleeves, carrying drivers, mounted on said shafts and adapted to rotate therewith, and adapted to engage the free ends of said coils and cause said coils to grip said collars and thus transmit the power from the driving-shaft to the counter-shaft, for the purpose set forth.

3. In a motor-vehicle, carrying a motor, of power-transmitting mechanism connected therewith and consisting of a driving-shaft and a counter-shaft, support therefor, said shafts carrying normally loose gears of different diameters, fixed collars on each of said shafts and in close proximity to each of said gears, a metal coil about each of said collars but normally out of contact therewith, one end of said coils fixed to said gears, sleeves, carrying drivers, mounted on said shafts and adapted to rotate therewith, and adapted to engage the free end of said coils, means whereby a driver-sleeve on each of said shafts is moved simultaneously toward the gear so that the metal coil on the driving-shaft will be tightened about the collar thereon and thus bring the gear adjacent thereto under the influence of said shaft, and through said gear transmit the power to wind the coil of the counter-shaft while the free end of said coil is engaged with its driver and thereby impart motion to said counter-shaft, for the purpose set forth.

4. The combination, in the power-transmitting mechanism of a motor-vehicle, of a driving-shaft carrying a driving-gear normally free thereon and a fixed collar in close proximity to said gear, a metal coil around said collar but normally out of engagement therewith, one end of said coil fixed to said gear, the opposite end free, a longitudinally-adjustable sleeve carrying a driver mounted on said shaft and adapted to be rotated therewith, a carrier for said sleeve whereby the driver on said sleeve is brought into engagement with the said coil and cause it to grip said collar and thereby impart motion to said gear, for the purpose set forth.

5. The combination, in the power-transmitting mechanism of a motor-vehicle, of a driving-shaft and a counter-shaft, each carrying gears normally loose thereon and adapted to register together, each of said shafts carrying fixed collars on which are mounted metal gripping-coils normally held out of engagement with said collars, one end of said coils fixed to said gears, the other end free, sleeves carrying the necessary drivers adapted to engage the free ends of said coils, said sleeves longitudinally adjustable on said shafts but adapted to rotate therewith, carriers for said sleeves, supports for said carriers, cams adapted to actuate said carriers, for the purpose set forth.

6. The herein-described means for transmitting power from a driving-shaft to a pulley or gear normally free thereon, consisting of a fixed collar on said shaft, a metal coil about such collar but normally out of contact therewith, one end of said coil fixed to such gear or pulley, the opposite end free, a driver mounted on said shaft and adapted to be rotated therewith, and longitudinally adjustable thereon, so as to be brought into engagement with said coil and cause it to grip said collar and thereby transmit the power of said shaft to said gear or pulley, for the purpose set forth.

7. In the power-transmitting mechanism of a motor-vehicle, the combination with the driving-shaft and a counter-shaft carrying normally free gears of different diameters adapted to register together, spring-clutch mechanism for transmitting power from the said driving-shaft to said counter-shaft, tumbler-gears adapted to be brought into engagement with a fixed gear on said driving-shaft, a support for said tumbler-gears, a worm-shaft actuated by said gears, worm-gears mounted on the cam-shaft of the spring-clutch-operating mechanism whereby a forward or reverse movement may be imparted to said cam-shafts, means whereby said tumbler-gears are operated, for the purpose set forth.

8. The combination, in the power-transmitting mechanism of a motor-vehicle, of a driving-shaft and a counter-shaft each carrying normally free gears of different diameters mounted thereon, means for transmitting the power from the said driving-shaft through any of said gears to the said counter-shaft, means for stepping up from the lowest to the highest speed, means whereby the further stepping is automatically stopped and the transmitting mechanism brought to a standstill, for the purpose set forth.

9. The combination, in the power-transmitting mechanism of a motor-vehicle, of a driving-shaft and a counter-shaft carrying gears of different diameters to represent the different speeds required, coiled-spring-clutch mechanism, clutch-engaging mechanism and its actuating mechanism, the power-transmitting gears on said shafts normally free thereon when disengaged from the clutch mechanism, operating mechanism for bringing the gears, representing the slowest speed, into engagement with said clutch mechanism, and from thence to all of the gears, alternately, to the highest speed, and means for automatically checking the clutch mechanism, and means whereby said clutch mechanism is returned to its first or normal position, for the purpose set forth.

10. The combination, in the power-transmitting mechanism of a motor-vehicle, of a driving-shaft and a counter-shaft carrying gears of different diameters to represent the different speeds required, coiled-spring-clutch mechanism, spring-clutch-engaging mechanism and its actuating mechanism, the power-transmitting gears on said shafts normally free thereon when disengaged from the clutch mechanism, operating mechanism for bringing the slowest speed-gears under the influence of the clutch mechanism, and from thence to all of the other gears, and means whereby the clutch mechanism is returned to zero or its first normal position at any point between the highest and lowest speeds, for the purpose set forth.

11. In the power-transmitting mechanism of a motor-vehicle, the combination, with the driving-shaft and counter-shaft carrying gears of different diameters to represent different speeds, all of which gears are normally free on said shafts, spring-clutch mechanism and its actuating mechanism consisting of frames carrying rotatable drivers, supports on which such frames are adapted to move to and from said gears, cams adapted to actuate said frames, shafts supporting said cams, tumbler-gears adapted to engage a fixed gear on said driving-shaft, worm-shaft actuated by said tumbler-gears, worm-wheels on said cam-shafts, means on one of said worm-wheels for disengaging the operating mechanism when connected with the handle-lever at the front of the vehicle, and means connected with such handle-lever whereby the tumbler-gears are reversed and the power-transmitting mechanism returned to zero, for the purpose set forth.

12. In a motor-vehicle, the combination with the driving-shaft and counter-shaft each carrying differential speed-gears normally free thereon, spring-clutch mechanism and its actuating mechanism comprising the reciprocating clutch-driver-carrying frames, actuating-cams therefor, tumbler-gear mechanism, worm-gear mechanism, of the operating mechanism for transmitting the speed from the lowest point to the highest, consisting of a pawl mounted on a movable support connected with means located at or near the front of the vehicle and within easy reach of the operator, a latch mounted on a movable support with which said pawl is adapted to engage to operate the said tumbler-gear mechanism, means whereby the engagement of said pawl and latch is automatically broken and said pawl and latch left free to be reëngaged therewith when required to change to a higher speed, means for automatically returning said pawl and latch to their normal positions, for the purpose set forth.

13. In a motor-vehicle, of the character described, the combination, in the operating mechanism consisting of the tumbler-gear mechanism, a latch mounted on a movable support and means connected with such support for engaging the mechanism of the tumbler-gears to move them in one direction so as to connect them with the driving-shaft, a pawl mounted on a movable support and adapted to be alternately brought into engagement with said latch, means whereby the latch-support is automatically locked in its forward position, means whereby the engagement of the said pawl and latch is automatically broken when said latch-support is locked, and means whereby said supports are returned to their normal position, for the purpose set forth.

14. In a motor-vehicle, of the character described, the combination, in the operating mechanism consisting of the tumbler-gear mechanism, a movable support carrying a latch and means for connecting with the said tumbler-gears, a support carrying a pawl said pawl adapted to engage with said latch, means for operating said supports when said latch and pawl are engaged and operate said tumbler-gears so that, one of said gears will be brought into engagement with a fixed gear on the driving-shaft and thus set in motion the power-transmitting mechanism, means for automatically locking the said movable latch-support until the vehicle is in motion, and means for automatically releasing said support and returning it to its normal position, and means for automatically returning said pawl-support to its normal position, for the purpose set forth.

15. In the operating mechanism of a motor-vehicle, comprising, in combination, a movable support carrying a latch or other engaging device whereby said support may be operated, a support carrying a pawl adapted to engage said latch, means for operating both supports when said pawl and latch are engaged, means for breaking such engagement and locking said latch-support at the completion of its forward movement, means for automatically releasing said latch-support and elevating said pawl at the same time, so that, said latch-support may be automatically returned to its normal position, and means whereby said pawl-support is automatically returned to its normal position in readiness to reëngage said latch, for the purpose set forth.

16. In the operating mechanism of a motor-vehicle, comprising, in combination, a movable support carrying an interlocking device, a second movable support also carrying an interlocking device, means for locking said supports together and moving them out of their normal position, means on one of said supports for setting in motion the power-transmitting mechanism, automatic means for locking the first support in its advanced position, and releasing it therefrom and returning it to its normal position, and means whereby the interlocking device of the second movable support is held in open position when the greatest speed of the vehicle is reached, and be held in such position until the power-transmitting mechanism has returned to zero or its normal position, for the purpose set forth.

17. In the operating mechanism of a motor-vehicle, comprising, in combination, tumbler-gears and their mechanism, movable supports or bars carrying interlocking devices, means on one of said supports to connect with said tumbler-gears to tilt them in one direction so as to connect them with the driving-shaft, a second pair of supports or sliding bars, one of which is also connected to the said tumbler-gears and adapted thereby to reverse them, means for automatically locking, unlocking and returning all of said supports or bars to their normal position, for the purpose set forth.

18. The combination, in the operating mechanism, of a motor-vehicle for reversing the power-transmitting mechanism and returning it to zero or a state of rest, consisting of a sliding bar or other like device carrying means to engage the reversing mechanism, a second sliding bar carrying a push-rod to engage the first bar and move it in one direction, a spring-actuated locking device to temporarily hold said first bar in its advanced position, means for automatically releasing said locking device, and means for returning both bars to their normal position, for the purpose set forth.

19. In a motor-vehicle, of the character described, the combination with a vertical steering-post of a horizontal handle-slide support projecting at right angles therefrom, a handle-slide adjustably mounted thereon, means for connecting said slide with the operating mechanism of the power-transmitting mechanism, for the purpose set forth.

20. In the operating mechanism of a motor-vehicle, comprising, in combination, a movable support carrying an interlocking device, a second movable support also carrying an interlocking device adapted to engage the interlocking device of the first-named support, means on one of said supports for engaging and setting in motion the power-transmitting mechanism, means for locking said supports together and moving them out of their normal position, and means for temporarily locking the first-named support in such advanced position, a rock-shaft actuated by the power-transmitting mechanism and carrying means for releasing said first-named support, and means on said rock-shaft for releasing the interlocking devices of said supports, means for returning both of said supports to their normal position, for the purpose set forth.

21. The combination, in the power transmitting and operating mechanism of a motor-vehicle, of the driving-shaft 4 and its power-transmitting gears 8, 9, 10 and 11, counter-shaft 16 and its gears 12, 13, 14 and 15 with which the first-named gears register, spring-clutches arranged as shown, driver-sleeve-carrying frames 19 and 20, supports 17 and 18 therefor, cam-shafts 118 and 119 carrying the cams 120, 121, 122 and 123 adapted to actuate said frames, tumbler-gears arranged as shown and adapted to be alternately brought into engagement with a fixed gear on the said driving-shaft, worm-shaft 110 connected with said tumbler-gear mechanism, worm-wheels on said cam-shafts adapted to engage said worm-shaft, projections on the face of one of said worm-wheels, supports 58 of the operating mechanism carrying the pivotally-supported latch 64, cam-plate 68 having a cam-slot adapted to engage a pin on said latch and cause it to be depressed when its support is moved from its normal position, support 57 carrying a pivotally-supported pawl adapted to engage said latch, means for operating said support and carry both supports forward, locking-bolt 144, rock-shaft 146 carrying means to engage said bolt, a pawl adapted to engage the said projections on said worm-wheel and means for transmitting the movement of said pawl to the said rock-shaft, means on said rock-shaft for temporarily lifting pawl 71 of the support 57, means for returning support 58 to its normal position while said pawl is lifted, substantially as shown and for the purpose set forth.

22. In a motor-vehicle, the combination with the driving-shaft and the counter-shaft carrying gears of different diameters representing different speeds, said gears normally free on said shafts, spring-clutch mechanism about said shafts, as shown, movable frames carrying devices to engage and tighten such spring-clutches about such shafts, means whereby said frames are operated to bring their devices into engagement with the spring-clutches of the gears representing the slowest rate of speed and be made to engage all of said gears throughout the series until the gears representing the highest speed are reached, and means whereby the further progress of said frames is arrested, and means whereby the whole power-transmitting mechanism is returned to zero or normal position, for the purpose set forth.

23. In a motor-vehicle, of the character described, the combination, with power-transmitting mechanism, a suitable motor, means whereby the power from said motor is carried to said transmitting mechanism and from thence to the running-gear of the vehicle, reversing mechanism for running said vehicle backward or forward, a handle-lever connected therewith, means for locking said mechanism in its forward position, means connected with the operating mechanism for returning the power-transmitting parts to zero whereby the said reversing mechanism is automatically released from its forward position and thrown out of gear so that all power will be thrown off the running-gear of the vehicle, for the purpose set forth.

24. In a motor-vehicle, the combination with the power-transmitting mechanism, actuating mechanism and operating mechanism therefor, of the reversing mechanism consisting of a plate loosely mounted on one of the shafts of the power-transmitting mechanism, said plate carrying intermediate gears, one of which gears is adapted to register with a gear on said shaft and the other with a gear on the stud of the sprocket-wheel that connects with the vehicle running-gear, a handle-lever and a bar for connecting said lever with said gear-plate, a locking device to engage means on said bar whereby said reversing mechanism is locked when thrown forward so as to give a forward movement to the vehicle, means for automatically unlocking said reversing mechanism and carrying it back so that the intermediate gears will be thrown out of register with the sprocket-wheel gear and maintained there, for the purpose set forth.

25. The combination, in the reversing mechanism of a motor-vehicle, consisting of a swinging plate, a support therefor, said plate carrying intermediate gears one of which gears is adapted to engage the sprocket-wheel stud-gear, and the other to engage a gear connected with the power-transmitting mechanism, a handle-lever and a connecting-bar pivoted to said gear-plate and handle-lever, means for locking said bar in its forward position and means for automatically releasing said bar and means for returning the same and operate the said gear-plate so that it will assume a neutral position with respect to the sprocket-gear, and means for maintaining it in such position so that the further transmission of power to the running-gear of the vehicle is shut off, for the purpose set forth.

26. The combination, in the reversing mechanism of a motor-vehicle, consisting of a swinging plate, a support therefor, intermediate gears mounted on said plate, one of which gears is adapted to register with the gear of the sprocket-wheel that transmits power to the running-gear of the vehicle, the other of said gears adapted to register with a gear connected with the power-transmitting mechanism, a handle-lever and a bar connecting such handle-lever with said gear-plate, means, when said gear-plate is operated to transmit a forward movement to the vehicle, whereby said plate is locked in such position, and means whereby said plate is released automatically, or through the medium of said handle-lever, so that the gear on said plate is thrown out of contact with the said sprocket-gear, and the further transmission of power to the running-gear of the vehicle is effectually shut off, for the purpose set forth.

27. The combination, in the reversing mechanism of a motor-vehicle, consisting of a swinging plate carrying intermediate gears adapted to engage a gear connected with the power-transmitting mechanism and a gear connected with the sprocket-wheel for transmitting power to the vehicle running-gear, a handle-lever, a connecting-bar between said handle-lever and gear-plate, means for locking said gear-plate when engaged with said sprocket-wheel gear for propelling the vehicle forward, means whereby said gear-plate is released automatically or through the medium of said handle-lever and thrown into a neutral position with respect to said sprocket-wheel gear and maintained in such position by means of a V-shaped construction on said plate, combined with a spring-actuated roller engaging therewith, substantially as shown.

28. In a motor-vehicle or device of like character, the combination, with the engine, of means connected with the balance-wheel for giving an initial rotary movement thereto, consisting of a spring for storing up power, a shaft on which said spring is mounted, said shaft adapted to be rotated by such spring, means whereby the power is thus imparted to the balance-wheel, and means whereby the said spring is rewound under the rotative influence of said wheel, for the purpose set forth.

29. In a motor-vehicle, the combination, with the engine, of means connected with the balance-wheel for imparting an initial rotary movement thereto, and means for restoring the power thus expended and to restore said power through the medium of said wheel, consisting of a coiled spring, a worm-shaft therefor to which one end of said spring is fixed, the free end of said spring being suitably anchored, an operating-rod, a lever having a pivotal support midway of its ends, one end of said lever carrying a grooved pulley and a gear, said pulley adapted to engage with grooves formed on the inner face of the wheel, said gear adapted to engage a gear on said worm-shaft, the other end of said lever adapted to be engaged by said rod, a ratchet-wheel on said worm-shaft, means for locking said ratchet-wheel against rotation, and means for releasing the same, a second pivoted lever carrying a similar grooved pulley adapted to engage with grooves in the outer face of said balance-wheel, and a gear adapted to engage with the said gear of the worm-shaft, means whereby said grooved pulley is automatically brought into engagement with said wheel so as to set in motion the mechanism for rewinding said spring and disengaging it therefrom, for the purpose set forth.

30. In a motor-vehicle, the herein-described device consisting of a coiled spring, for automatically imparting an initial rotary movement to the balance-wheel of the engine and rewinding said spring, consisting of a worm-shaft to which one end of said spring is fixed, grooves formed on the outer and inner face of the balance-wheel of the engine, grooved pulleys adapted to engage said grooves, pivotally-supported levers on which said pulleys are rotatively mounted gears rigidly secured to said pulleys adapted to engage with a gear on said worm-shaft whereby a forward or reverse motion is imparted to said shaft through the medium of said pulleys, means for bringing one of said pulleys in contact with the balance-wheel for imparting an initial rotary movement thereto, and means for automatically disengaging said pulley therefrom, means for automatically engaging the other grooved pulley with said wheel to rewind said spring, and disengaging it therefrom, for the purpose set forth.

Signed at Bridgeport, in the county of Fairfield and State of Connecticut, this 18th day of December, A. D. 1897.

CLARENCE STERLING.

Witnesses:
JOHN B. CLAPP,
D. HOMER JENNINGS.